United States Patent
Hardwick et al.

(10) Patent No.: US 10,041,241 B2
(45) Date of Patent: Aug. 7, 2018

(54) METHOD AND APPARATUS FOR INSTALLATION OF A TOILET SYSTEM ON AN AIRCRAFT

(71) Applicant: B/E AEROSPACE, INC., Wellington, FL (US)

(72) Inventors: Christopher Hardwick, Roscoe, IL (US); Thao Hoang, Rockford, IL (US); Bradley J. Buniak, Schaumburg, IL (US); Stephen M. Niznik, Rockford, IL (US); William Pedersen, Rockford, IL (US); Mark A. Pondelick, Rockton, IL (US); Gregory E. Sund, Cherry Valley, IL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 58 days.

(21) Appl. No.: 15/084,358

(22) Filed: Mar. 29, 2016

(65) Prior Publication Data
US 2016/0289943 A1 Oct. 6, 2016

Related U.S. Application Data

(60) Provisional application No. 62/140,260, filed on Mar. 30, 2015.

(51) Int. Cl.
*E03D 11/00* (2006.01)
*E03D 9/00* (2006.01)
(Continued)

(52) U.S. Cl.
CPC ............... *E03D 9/00* (2013.01); *B64D 11/02* (2013.01); *E03D 5/012* (2013.01); *E03D 5/10* (2013.01);
(Continued)

(58) Field of Classification Search
CPC ........................................... E03D 9/00
(Continued)

(56) References Cited

U.S. PATENT DOCUMENTS

| 2,680,714 A | 6/1954 | Carlsson et al. |
| 2,708,033 A | 5/1955 | Thomas |

(Continued)

FOREIGN PATENT DOCUMENTS

| EP | 1818462 A1 | 8/2007 |
| EP | 2050882 B1 | 9/2015 |
| WO | 2008010570 A1 | 1/2008 |

OTHER PUBLICATIONS

Non-Final Office Action on U.S. Appl. No. 15/084,185, dated Apr. 7, 2017, 14 pages.
(Continued)

*Primary Examiner* — Christine Skubinna
(74) *Attorney, Agent, or Firm* — Donna P. Suchy (57) ABSTRACT

A method of installing a toilet system on board an aircraft is generally described. The toilet system includes a base support having a right base support and a left base support, a toilet bowl, a right side support and a left side support each supporting the toilet bowl. The method comprises lowering the toilet bowl on to the base supports to at least partially engage a first locking mechanism; sliding the toilet bowl in a forward direction to engage a second locking mechanism; and inserting a first pin to couple the right base support to the right side support and a second pin to couple the left base support to the left side support in order to completely engage the first locking mechanism.

13 Claims, 5 Drawing Sheets

(51) Int. Cl.
*B64D 11/02* (2006.01)
*E03D 11/13* (2006.01)
*E03D 5/10* (2006.01)
*E03D 5/012* (2006.01)
*F16K 3/04* (2006.01)
*F16K 31/04* (2006.01)
*F16K 31/46* (2006.01)
*E03D 11/16* (2006.01)
*E03F 1/00* (2006.01)

(52) U.S. Cl.
CPC ............ *E03D 11/13* (2013.01); *E03D 11/135* (2013.01); *E03D 11/16* (2013.01); *E03F 1/006* (2013.01); *F16K 3/04* (2013.01); *F16K 31/047* (2013.01); *F16K 31/465* (2013.01)

(58) Field of Classification Search
USPC ........................................................ 4/252.1
See application file for complete search history.

(56) References Cited

U.S. PATENT DOCUMENTS

| | | |
|---|---|---|
| 2,878,829 A | 3/1959 | Folmsbee |
| 3,411,162 A | 11/1968 | Palmer |
| 3,447,777 A | 6/1969 | Carlson |
| 3,510,099 A | 5/1970 | Crump |
| 3,616,617 A | 11/1971 | De Groote |
| 3,719,957 A | 3/1973 | Riedel |
| 3,722,850 A | 3/1973 | Kemper |
| 3,835,479 A | 9/1974 | Milette et al. |
| 3,902,876 A | 9/1975 | Moen et al. |
| 3,939,500 A | 2/1976 | Miller et al. |
| 3,995,328 A | 12/1976 | Carolan et al. |
| 4,041,554 A | 8/1977 | Gregory et al. |
| 4,237,934 A | 12/1980 | Gregory et al. |
| 4,289,611 A | 9/1981 | Brockmann |
| 4,376,314 A | 3/1983 | Iwans |
| 4,438,781 A | 3/1984 | Brenholt |
| 4,469,497 A | 9/1984 | Linhardt |
| 4,511,117 A | 4/1985 | Soderstrom |
| 4,546,502 A | 10/1985 | Lew |
| 4,601,210 A | 7/1986 | Brown |
| 4,612,120 A | 9/1986 | Box |
| 4,635,901 A | 1/1987 | Pond |
| 4,713,847 A | 12/1987 | Oldfelt et al. |
| 4,783,859 A | 11/1988 | Rozenblatt et al. |
| 4,811,754 A | 3/1989 | Wilhelm |
| 4,968,325 A | 11/1990 | Black et al. |
| 5,007,117 A | 4/1991 | Oldfelt et al. |
| 5,035,011 A | 7/1991 | Rozenblatt et al. |
| 5,048,130 A | 9/1991 | Brotman et al. |
| 5,065,786 A | 11/1991 | Rozenblatt |
| 5,099,867 A | 3/1992 | Emery |
| 5,142,712 A | 9/1992 | Hennessy |
| 5,231,706 A | 8/1993 | Kendall |
| 5,271,105 A | 12/1993 | Tyler |
| 5,317,763 A | 6/1994 | Frank et al. |
| 5,326,069 A | 7/1994 | Clear et al. |
| 5,344,085 A | 9/1994 | Hofseth |
| 5,372,710 A | 12/1994 | Frank |
| 5,464,191 A | 11/1995 | Shenk |
| 5,515,554 A | 5/1996 | Clear et al. |
| 5,535,770 A | 7/1996 | Nurmi |
| 5,604,938 A | 2/1997 | Tyler |
| 5,625,905 A | 5/1997 | Woods |
| 5,707,027 A | 1/1998 | Hiesener |
| 5,754,987 A | 5/1998 | Johansson et al. |
| 5,813,061 A | 9/1998 | Tornqist |
| 5,873,135 A | 2/1999 | Tornqvist |
| 5,909,968 A | 6/1999 | Olin et al. |
| 5,956,780 A | 9/1999 | Tyler |
| 6,085,366 A | 7/2000 | Pondelick et al. |
| 6,131,596 A | 10/2000 | Monson |
| 6,148,860 A | 11/2000 | Sigler |
| 6,152,160 A | 11/2000 | Bowden Wilcox et al. |
| 6,186,162 B1 | 2/2001 | Purvis et al. |
| 6,202,683 B1 | 3/2001 | Smith |
| 6,212,700 B1 | 4/2001 | Giesler et al. |
| 6,223,357 B1 | 5/2001 | Claas |
| 6,226,807 B1 | 5/2001 | Rozenblatt et al. |
| 6,240,575 B1 | 6/2001 | Polo Sanchez |
| 6,325,356 B1 | 12/2001 | Rozenblatt |
| 6,347,416 B1 | 2/2002 | Anderson et al. |
| 6,349,424 B1 | 2/2002 | Stradinger et al. |
| 6,349,425 B1 | 2/2002 | Stradinger et al. |
| 6,353,942 B1 | 3/2002 | Pondelick et al. |
| 6,370,709 B1 | 4/2002 | Stradinger et al. |
| 6,394,122 B1 | 5/2002 | Sibley et al. |
| 6,402,799 B1 | 6/2002 | Kokubo et al. |
| 6,453,481 B1 | 9/2002 | Pondelick et al. |
| 6,484,743 B2 | 11/2002 | Baukman |
| 6,502,278 B2 | 1/2003 | Oh et al. |
| 6,513,174 B1 | 2/2003 | Johansson |
| 6,536,054 B2 | 3/2003 | Anderson et al. |
| 6,536,055 B2 | 3/2003 | Pondelick et al. |
| 6,546,593 B2 | 4/2003 | Oh et al. |
| 6,575,425 B1 | 6/2003 | Betz |
| 6,648,002 B2 | 11/2003 | Lappalainen |
| 6,704,947 B2 | 3/2004 | Stradinger et al. |
| 6,729,368 B2 | 5/2004 | Nguyen |
| 6,732,386 B2 | 5/2004 | Anderson et al. |
| 6,748,973 B2 | 6/2004 | Lindroos |
| 6,763,531 B1 | 7/2004 | Huffman et al. |
| 6,883,188 B2 | 4/2005 | Sigler et al. |
| 6,977,005 B2 | 12/2005 | Erdmann et al. |
| 6,981,285 B2 | 1/2006 | Sigler et al. |
| 7,127,749 B2 | 10/2006 | Ling |
| 7,156,363 B2 | 1/2007 | Parsons et al. |
| 7,169,305 B2 | 1/2007 | Gomez |
| 7,188,822 B2 | 3/2007 | Marcichow et al. |
| 7,331,365 B2 | 2/2008 | Nguyen |
| 7,690,053 B2 | 4/2010 | Pondelick |
| 7,921,478 B1 | 4/2011 | Vanini |
| 8,607,370 B2 | 12/2013 | Hoang et al. |
| 8,613,115 B2 | 12/2013 | Seibt et al. |
| 8,769,731 B2 | 7/2014 | Seibt |
| 8,887,320 B2 | 11/2014 | Dezarn et al. |
| 2001/0034902 A1 | 11/2001 | Tyler |
| 2002/0069459 A1 | 6/2002 | Pondelick et al. |
| 2002/0145080 A1 | 10/2002 | Renken et al. |
| 2005/0173336 A1 | 8/2005 | Arnaud |
| 2006/0075546 A1 | 4/2006 | Sigler |
| 2007/0079432 A1 | 4/2007 | Shoikhet et al. |
| 2007/0226887 A1 | 10/2007 | Lappalainen et al. |
| 2007/0297894 A1 | 12/2007 | Dandasi et al. |
| 2010/0083433 A1* | 4/2010 | Pondelick .............. B64D 11/02 4/316 |
| 2010/0083435 A1 | 4/2010 | Hoang et al. |
| 2011/0173743 A1 | 7/2011 | Jensen et al. |
| 2014/0041109 A1 | 2/2014 | Stauber et al. |
| 2014/0101837 A1 | 4/2014 | Boodaghians et al. |
| 2014/0137319 A1 | 5/2014 | Beach et al. |
| 2014/0208498 A1 | 7/2014 | Beach et al. |
| 2014/0223655 A1 | 8/2014 | Dillard |
| 2014/0259343 A1 | 9/2014 | Wilson et al. |
| 2015/0013058 A1 | 1/2015 | Boodaghians et al. |

OTHER PUBLICATIONS

International Search Report and Written Opinion issued in related application PCT/US2016/024983, dated Jun. 17, 2016, 15 pages.
International Search Report and Written Opinion for PCT/US2016/024888, dated Aug. 2016, 10 pages.
International Search Report and Written Opinion for PCT/US2016/024909, dated Jun. 10, 2016, 7 pages.
International Search Report and Written Opinion for PCT/US2016/024936, dated Jun. 16, 2016, 6 pages.
International Search Report and Written Opinion for PCT/US2016/024983, dated Jun. 17, 2016, 9 pages.
Non-Final Office Action for U.S. Appl. No. 15/084,078, dated Jan. 5, 2018, 8 pages.

(56) References Cited

OTHER PUBLICATIONS

Ex Parte Quayle Action for U.S. Office Action on U.S. Appl. No. 15/084,257 dated Sep. 27, 2017. 24 pages.
Final Office Action for U.S. Appl. No. 15/084,185 dated Oct. 20, 2017. 12 pages.
International Search Report for PCT/US2016/024963, dated Aug. 16, 2016, 4 pages.
Non-Final Office Action for U.S. Appl. No. 15/084,317 dated Sep. 27, 2017. 25 pages.
U.S. Notice of Allowance on U.S. Appl. No. 15/084,257 dated Dec. 7, 2017. 7 pages.
Final Office Action issued for U.S. Appl. No. 15/084,317 dated May 7, 2018. 8 pages.

* cited by examiner

METHOD AND APPARATUS FOR INSTALLATION OF A TOILET SYSTEM ON AN AIRCRAFT

CROSS-REFERENCES TO RELATED APPLICATIONS

This claims the benefit of U.S. Provisional Patent Application No. 62/140,260, entitled "VACUUM TOILET SYSTEM AND INSTALLATION METHOD THEREOF," and filed on Mar. 30, 2015, which is incorporated herein by reference in its entirety.

FIELD OF THE DISCLOSURE

The present disclosure relates generally to vacuum toilet systems and more particularly, to method and apparatus for installation of such systems.

BACKGROUND

Designing a toilet for an aircraft poses challenges that do not generally occur in ground-based toilet designs. For instance, in an aircraft, space and weight are at a premium, and using regular water-flush toilets is not practical. Also, installing and removing the toilet is much more difficult, since space restrictions make the installation and removal process labor intensive.

DRAWINGS

While the appended claims set forth the features of the present techniques with particularity, these techniques may be best understood from the following detailed description taken in conjunction with the accompanying drawings of which:

DETAILED DESCRIPTION

The following discussion is directed to various exemplary embodiments. However, one possessing ordinary skill in the art will understand that the examples disclosed herein have broad application, and that the discussion of any embodiment is meant only be exemplary of that embodiment, and not intended to suggest that the scope of the disclosure, including claims, is limited to that embodiment.

Certain terms are used throughout the following description to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

The disclosure is generally directed to a method and apparatus for installing a toilet on board an aircraft. According to an embodiment, the toilet system includes a base support including a right base support and a left base support, a toilet bowl, and side supports including a right side support and a left side support each supporting the toilet bowl. According to some embodiments, the method comprises lowering the toilet bowl supported by the left side support and the right side support on to the base support having the left base support and the right base support to at least partially engage a first locking mechanism; sliding the toilet bowl supported by the left side support and the right side support in a forward direction to engage a second locking mechanism; and inserting a first pin to couple the right base support to the right side support and a second pin to couple the left base support to the left side support in order to completely engage the first locking mechanism.

In an embodiment, the toilet system configured for use on board an aircraft comprises a base support including a right base support and a left base support; a toilet bowl; a side support including a right side support and a left side support each supporting the toilet bowl; a first locking mechanism configured to secure the toilet bowl to the aircraft by coupling the right base support to the right side support and coupling the left base support to the left side support; and a second locking mechanism configured to secure the toilet bowl to the aircraft by coupling the right base support to the right side support and coupling the left base support to the left side support; where the first locking mechanism and the second locking mechanism operate independent of each other.

Figure 1:
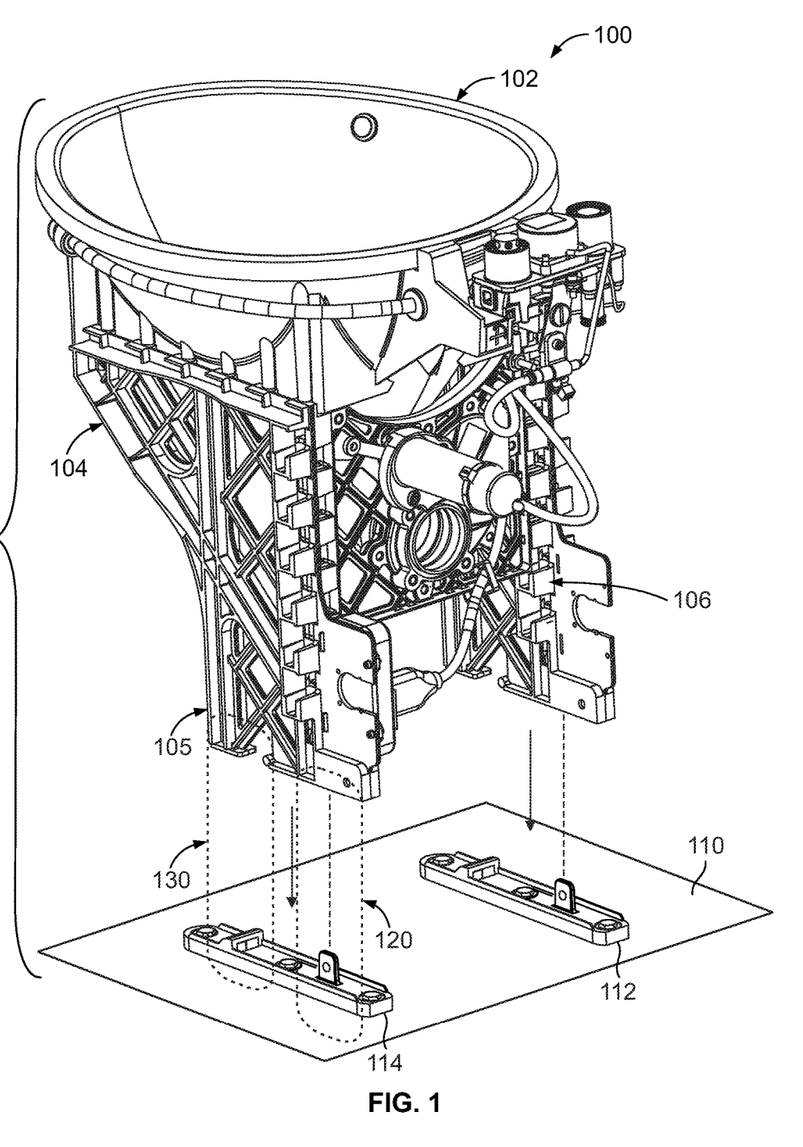
FIG. 1 is a perspective view of a toilet configured according to an embodiment.

Turning to FIG. 1, a toilet configured according to an embodiment is shown. The toilet, generally labelled 100, is configured to be deployed on an aircraft, and may be housed within an external housing (not shown). The toilet 100 includes a bowl 102 attached to a frame 104. The frame 104 includes at least a left side support 105 and a right side support 106. In some embodiments, the left side support 105 and the right side support 106 together support the toilet bowl 102 as shown in FIG. 1. The toilet system 100 is mounted on an aircraft structure 110. As shown in FIG. 1, a left base support 114 and a right base support 112 are mounted on the aircraft structure 110. A first locking mechanism 120 (discussed later) couples the right base support 112 to the right side support 106 and couples the left base support 114 to the left side support 105, thereby securing the toilet bowl 102 to the aircraft structure 110. A second locking mechanism 130 (discussed later) also couples the right base support 112 to the right side support 106 and couples the left base support 114 to the left side support 105, thereby further securing the toilet bowl 102 to the aircraft structure 110.

Figure 4:
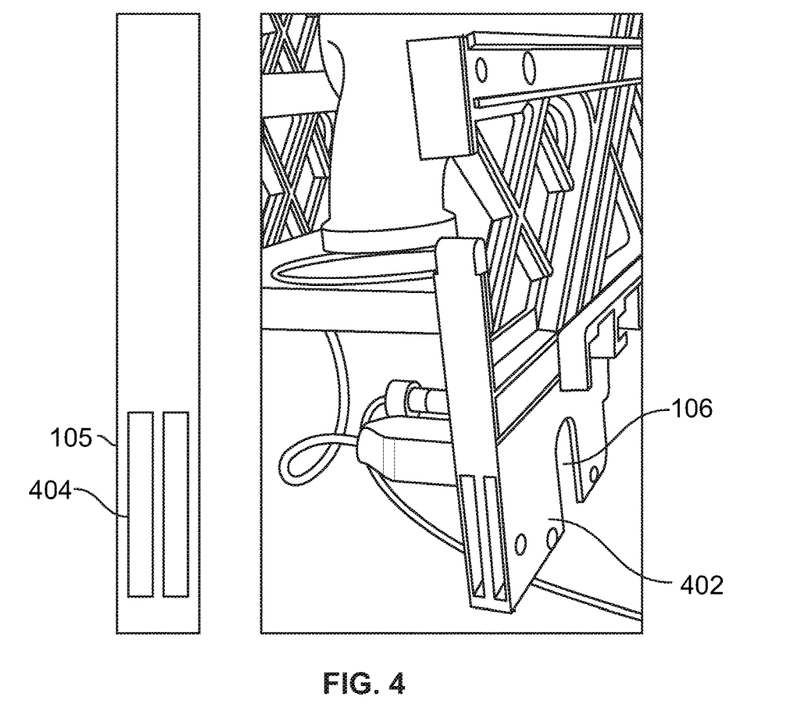
FIG. 4 is an exploded view of an end face of the support structure of a toilet configured according to an embodiment.
Figure 5:
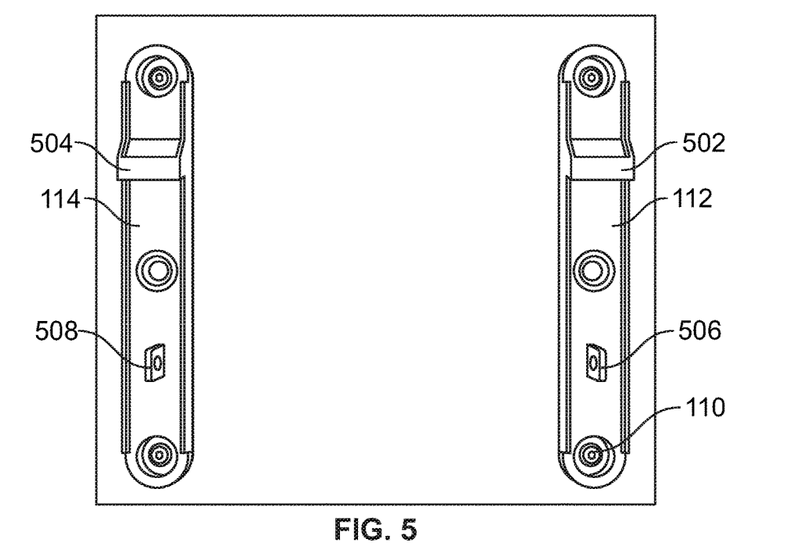
FIG. 5 is a top view of a base support of a toilet configured according to an embodiment.
Figure 6:
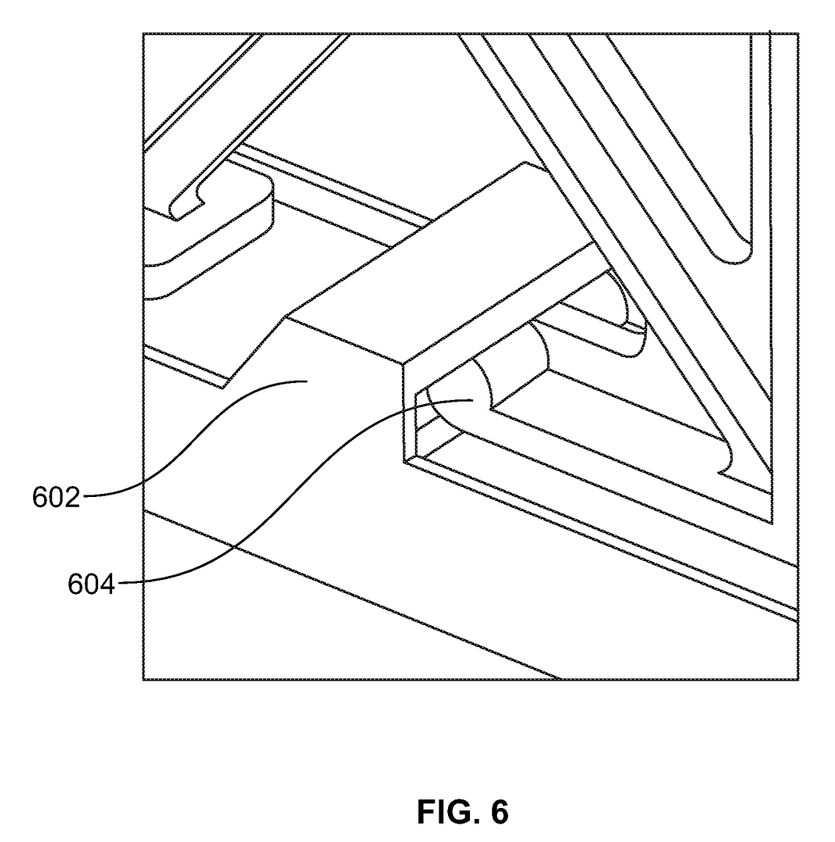
FIG. 6 is an exploded view of a locking mechanism of a toilet configured according to an embodiment.

Next, features of the first locking mechanism 120 will be described with reference to FIGS. 3-5. As illustrated more clearly in FIGS. 3 and 5, each of the left base support 114 and the right base support 112 includes a respective tab 314 (508), 316 (506) extending vertically upward from the aircraft structure 110. Each of the left side support 105 and the right support 106 includes a respective end face illustrated in FIG. 4. The end face of the left side support 105 includes a cavity 404 and the end face of the right side support 106 includes a cavity 402. In an embodiment, the tabs 314, 508, 316, 506 are configured to be inserted into the respective cavity 404, 402 of the side supports 105, 106.

Figure 3:
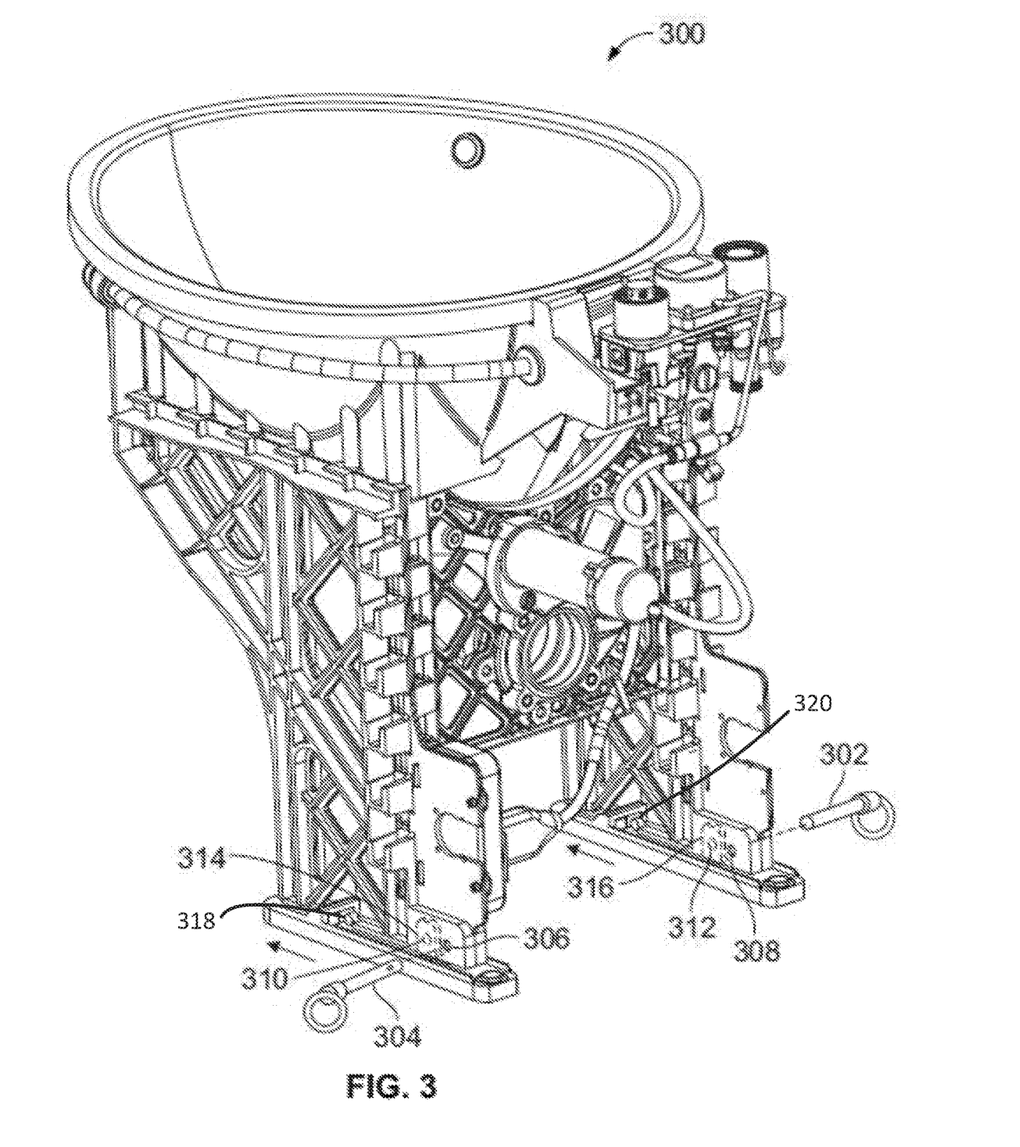
FIG. 3 is a perspective view of a toilet according to an embodiment.

As illustrated in FIG. 3, in an embodiment, the tabs 314 (508), 316 (506) and the side supports 105, 106 each include a through-hole 306, 308, 310, 312. In an embodiment, when the first locking mechanism 120 is completely engaged, the through hole 306 in the left side support 105 is configured to be aligned with the through hole 310 in the tab 314 (508) of the left base support 114, and the through hole 308 in the right side support 106 is configured to be aligned with the through hole 312 in the tab 316 (506) of the right base support 112. In some embodiments, a first pin 302 and a second pin 304 are provided to be inserted through the through-holes 308, 312 and 304, 306 respectively to completely engage the first locking mechanism 120. In some embodiments, the first pin 302 and the second pint 304 are each a hitch pin. A person skilled in the art will understand that various other structures may be provided to couple the right base support 112 to the right side support 106 and couple the left base support 114 to the left side support 105 via the tabs 314, 316, 506, 508, the cavities 404, 402 of the side supports 105, 106, and the respective through-holes 306, 308, 310, 312. For instance, according to some embodiments, a cotter pin may be provided. In some embodiments, as shown in FIG. 5, the tabs 506, 508 are provided at a substantially rear portion of the respective base supports 112, 114.

Figure 2A:
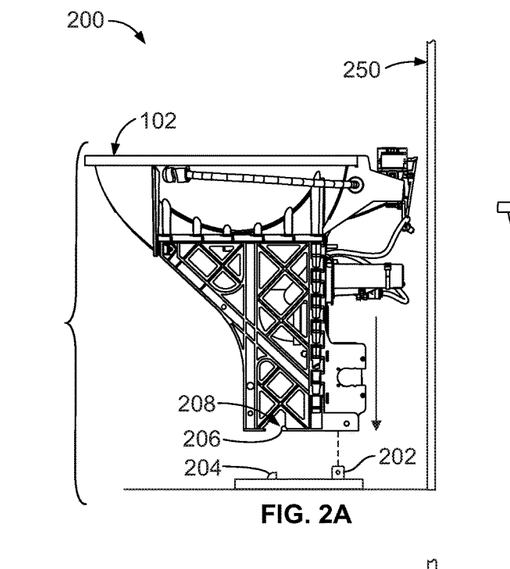
FIGS. 2A, 2B, 2C, and 2D are a sequential depiction of an installation method of a toilet according to an embodiment.

Next, features of the second locking mechanism 130 will be described with reference to FIGS. 2A and 3-6. As can be seen more clearly in FIGS. 5 and 6, the left base support 114 and the right base support 112 each include a respective locking receptacle 504, 502. Moreover, as seen in FIGS. 2A and 3, the end faces of each of the left side support 105 and the right side support 106 includes a cutout portion 208. The left side support has a left side protrusion 318 and the right side support 106 has a right side protrusion 320 extending into the cutout portion 208. According to an embodiment, the left side protrusion 318 is configured to couple with the left side locking receptacle 504 and the right side protrusion 320 is configured to couple with the right side locking receptacle 502. As can be seen more clearly in FIG. 6, the protrusion 604 is configured to be inserted into the locking receptacle 602 and positively engage with the locking receptacle 602 such that some force is required during installation to make a proper fit. According to an embodiment, the locking receptacles 502, 504 are provided on a substantially mid-point of the respective base supports 112, 114.

Next, a method of installation of the toilet 100 and the engagement of the first locking mechanism 120 and the second mechanism 130 (according to an embodiment) will be described with reference to FIGS. 2A, 2B, 2C, and 2D. As shown in FIGS. 2A-2D, a wall 250 of the aircraft lavatory does not leave much space for installation of the toilet 200. Conventional toilet systems must be tilted back to engage a rear locking mechanism. Then the toilet must be rotated downward to fully seat on the base support and is then locked into place using quarter-turn fasteners or hitch pins at the front of the assembly. This could prove to be cumbersome due to the proximity of lavatory shroud trim or other interferences in the area. The toilet apparatus configured according to an embodiment illustrated in the figures addresses these concerns.

FIGS. 2A-2D illustrate a side view of the toilet 200. In particular, the left side support 105 and the left base support 114 are shown along with features of the first locking mechanism 120 and the second locking mechanism 130. A person skilled in the art will understand that the description below similarly applies to the right side support 106 and the right base support 114.

Referring now to FIG. 2A, the toilet 200 is first lowered on to the left base support 114 in the direction of the arrow shown. According to some embodiments, the cavities 404, 402 of the side supports 105, 106 are aligned with the respective tabs 314, 316, 508, 506, and the cutout portion 208 in the side supports 105, 106 is aligned with the respective locking receptacle 504, 502. In the example embodiment shown in FIG. 2A, the cutout portion 208 is positioned directly above a locking receptacle 204 and the cavities of the side supports are positioned directly above the tab 202.

Figure 2B:
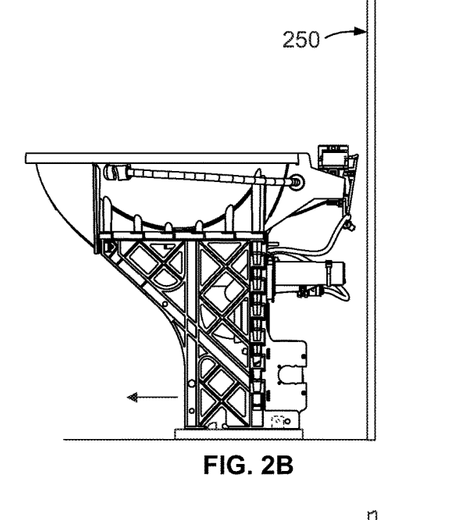

Next, as shown in FIG. 2B, the toilet 200 is lowered onto the base supports. In an embodiment shown in FIG. 2B, the projection 206 is positioned next to the locking receptacle 204. In the arrangement shown in FIG. 2B, the first locking mechanism 120 is at least partially engaged where the tabs 314, 316, 508, 506 are inserted into the respective cavities 404, 402 of the side supports 105, 106. Next, the method includes moving the toilet 200 in a forward direction away from the wall 250 in the direction of the arrow shown in FIG. 2B.

Figure 2C:
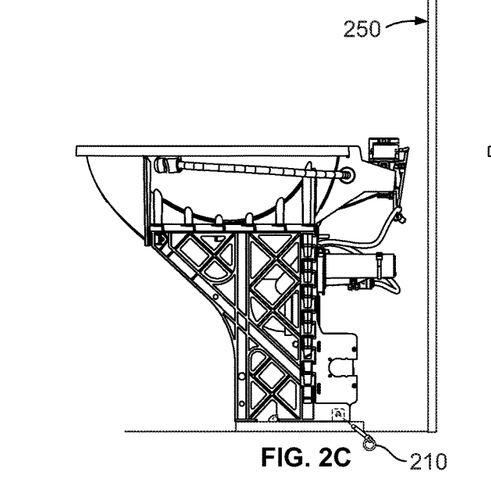

As illustrated in FIG. 2C, the second locking mechanism 130 is engaged when the toilet 200 is moved in a forward direction. In particular, the projection 206 is inserted into the locking receptacle 204 to couple the side support to the base support. As discussed above, the second locking mechanism 130 couples the right base support 112 to the right side support 106 and couples the left base support 114 to the left side support 105. In addition, as discussed above with reference to FIG. 3, the through hole 306 in the left side support 105 is configured to be aligned with the through hole 310 in the tab 314 (508) of the left base support 114, and the through hole 308 in the right side support 106 is configured to be aligned with the through hole 312 in the tab 316 (506) of the right base support 112.

Figure 2D:
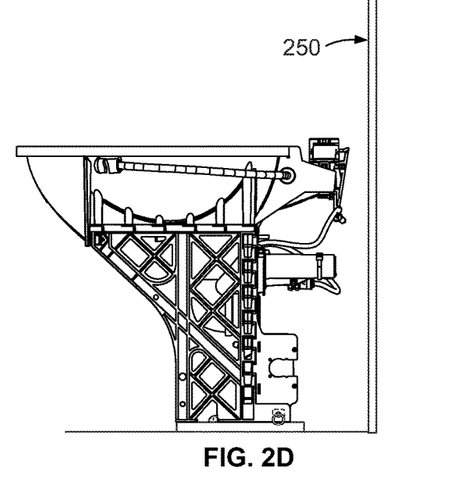

With reference to FIG. 2D, a pin 210 is inserted into the through-holes of the tab 202 and the side supports to completely engage the first locking mechanism 120 according to some embodiments. FIG. 2D illustrates the final position of the toilet 200 once it is installed according to the embodiments discussed above.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

The particular implementations shown and described herein are illustrative examples and are not intended to otherwise limit the scope of the disclosure in any way. For the sake of brevity, conventional electronics, control systems, software development and other functional aspects of the systems (and components of the individual operating components of the systems) may not be described in detail.

The steps of all methods described herein are performable in any suitable order unless otherwise indicated herein or otherwise clearly contradicted by context. No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The invention claimed is:

1. A toilet system configured for use on board an aircraft comprising:
    a base support mounted on the aircraft, the base support including a right base support and a left base support;
    a toilet bowl;
    a right side support and a left side support each supporting the toilet bowl;
    a first locking mechanism configured to secure the toilet bowl to the aircraft by coupling the right base support to the right side support and coupling the left base support to the left side support, the first locking mechanism comprising:
        a tab provided on each of the left base support and the right base support, each tab having a through-hole and end portion of each of the left side support and the right side support having a corresponding through-hole;
        a corresponding cavity on an end face of each of the left side support and the right side support, each tab configured to be inserted into the respective cavity on the end faces of each of the left side support and the right side support; and
        a first pin configured to be inserted through the through-hole on i) one of the left side support and the right side support, and the through-hole on the tab on ii) one of the left base support and the right base support; and
    a second locking mechanism configured to secure the toilet bowl to the aircraft by coupling the right base support to the right side support and coupling the left base support to the left side support; wherein
    the first locking mechanism and the second locking mechanism operate independent of each other.

2. The toilet system according to claim 1, wherein the first locking mechanism further comprises:
    a second pin configured to be inserted through the through-hole on i) the other of the left side support and right side support; and the through-hole on the tab on ii) the other of the left base support and the right base support.

3. The toilet system according to claim 2, wherein the first pin and the second pin are a hitch pin.

4. The toilet system according to claim 1, wherein the tabs are provided at a rear portion of the respective left base support and the right base support.

5. The toilet system according to claim 1, wherein the second locking mechanism comprises:
    a right side protrusion extending from an end of the right side support and a left side protrusion extending from an end of the left side support; and
    a respective locking receptacle positioned on each of the right base support and the left base support and corresponding to the right side protrusion and the left side protrusion; wherein
    the right side protrusion and the left side protrusion are configured to be inserted into the respective locking receptacles.

6. A method of installing a toilet system on board an aircraft, the toilet system including a base support mounted on the aircraft, the base support having a right base support and a left base support, a toilet bowl, a right side support and a left side support each supporting the toilet bowl, the method comprising:
    lowering the toilet bowl supported by the left side support and the right side support on to the left base support and the right base support respectively to at least partially engage a first locking mechanism;
    sliding the toilet bowl supported by the left side support and the right side support in a forward direction to engage a second locking mechanism; and
    inserting a first pin to couple the right base support to the right side support and a second pin to couple the left base support to the left side support in order to completely engage the first locking mechanism.

7. The method according to claim 6, wherein the first locking mechanism comprises:
    a tab provided on each of the left base support and the right base support; and
    a corresponding cavity on an end face of each of the left side support and the right side support;
    wherein at least partially engaging the first locking mechanism comprises
    aligning the tab with the respective cavity on the end faces of each of the left side support and the right side support; and
    inserting the tab into the respective cavity on the end faces of each of the left side support and the right side support.

8. The method according to claim 7, wherein the tab on each of the left base support and the right base support has a through-hole; and
    an end portion of each of the left side support and the right side support has a corresponding through-hole; and
    wherein completely engaging the first locking mechanism further comprises
        inserting the first pin through the through-hole on the right side support and the through-hole on the tab on the right base support; and
        inserting the second pin through the through-hole on the left side support and the through-hole on the tab on the left base support.

9. The method according to claim 6, wherein the first pin and the second pin are a hitch pin.

10. The method according to claim 7, wherein the tabs are provided at a rear portion of the respective left base support and the right base support.

11. The method according to claim 6, wherein the second locking mechanism comprises:
    a right side protrusion extending from an end of the right side support and a left side protrusion extending from an end of the left side support; and
    a respective locking receptacle positioned on each of the right base support and the left base support and corresponding to the right side protrusion and the left side protrusion;
    wherein engaging the second locking mechanism comprises inserting the right side protrusion and the left side protrusion into the respective locking receptacles by sliding the right side support and the left side support in a forward direction.

12. A toilet system configured for use on board an aircraft comprising:
   a base support mounted on the aircraft;
   a toilet bowl;
   a side support configured to support the toilet bowl;
   a first locking mechanism configured to secure the toilet bowl to the aircraft by coupling the base support to the side support, the first locking mechanism comprising:
      a tab provided on the base support; and
      a corresponding cavity on an end face of the side support, wherein the tab is configured to be inserted into the respective cavity on the end face of the side support;
   wherein the tab on the base support has a through-hole, an end portion of the side support has a corresponding through-hole, and the first locking mechanism further comprises a pin configured to be inserted through the through-hole on the side support and the through-hole on the tab on the base support; and
   a second locking mechanism configured to secure the toilet bowl to the aircraft by coupling the base support to the side support; wherein the first locking mechanism and the second locking mechanism operate independent of each other.

13. The toilet system according to claim 12, wherein the second locking mechanism comprises:
   a protrusion extending from an end of the side support; and
   a locking receptacle positioned on the base support and corresponding to the protrusion; wherein
   the protrusion is configured to be inserted into the locking receptacle.

* * * * *